Jan. 23, 1934.  E. P. HARTRY  1,944,429
AUTOMOBILE BODY CONSTRUCTION
Original Filed Aug. 14, 1929   2 Sheets-Sheet 1

INVENTOR.
Earl P. Hartry
BY Parker & Burton
ATTORNEYS

Jan. 23, 1934.　　　　E. P. HARTRY　　　　1,944,429
AUTOMOBILE BODY CONSTRUCTION
Original Filed Aug. 14, 1929　　2 Sheets-Sheet 2

INVENTOR.
Earl P. Hartry
BY Parker & Burton
ATTORNEYS

Patented Jan. 23, 1934

1,944,429

UNITED STATES PATENT OFFICE 1,944,429

AUTOMOBILE BODY CONSTRUCTION

Earl P. Hartry, St. Paul, Minn., assignor of one-half to Russell Sabor, Minneapolis, Minn.

Application August 14, 1929, Serial No. 385,863
Renewed March 3, 1933

6 Claims. (Cl. 296—28)

My invention relates to improvements in automobile body construction and particularly to the construction of automobile closed bodies of permanent or convertible type.

My object is the provision of an automobile body of this character having front and rear seats for passengers and enclosing side walls, which body is of a distinctively unique type; is appreciably streamlined to reduce head resistance; provides a clear vision towards the rear for the driver over the rear fender on the same side of the body and along the outside of the rear portion of the side wall on the same side of the body; furnishes commodious seating capacity in the front seat for three passengers and possesses other distinct and meritorious advantages.

Roadster and coupe bodies have heretofore been designed which provide comfortable seating capacity for three persons in a single seat but such bodies are limited as to their maximum seating capacity while my improved body is, due to its novel construction, adapted to carry three persons in the front seat and also has a rear seat capable of carrying two or more persons. The front seat has a length substantially greater than the rear seat and extends beyond the substantially parallel side walls at the opposite ends of the rear seat, the rear side walls terminate at the rear of the front seat substantially inwardly of the front side walls which converge from the front seat toward the front of the body, and a suitable window is arranged at the rear of the front seat on the driver's side at least, between the front side wall and the rear side wall, giving clear rear vision over the rear fender on the same side of the body.

Other desirable features and advantages of my improved type of body will more fully appear from the following specification, appended claims and accompanying drawings, wherein:

Figure 1:
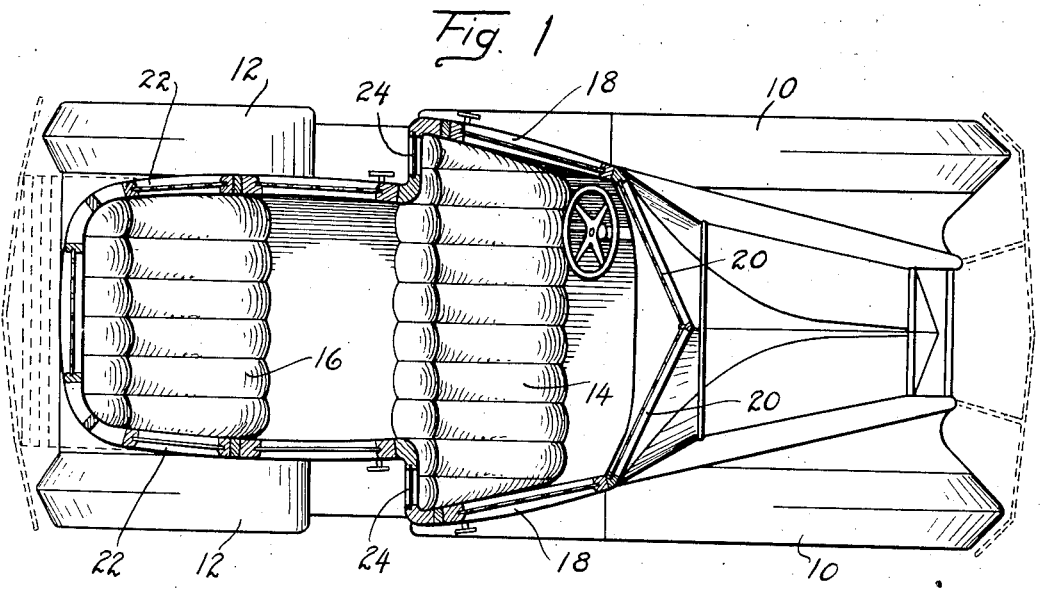
Fig. 1 is a view taken on the line 1—1 of Fig. 2.

In the figures of the drawings my invention is embodied in a body for an automobile having front and rear fenders 10 and 12 respectively, front and rear seats 14 and 16 respectively, and front side walls 18 which converge from the rear line of the front seat 14 toward the front as shown particularly in Fig. 1 of the drawings. The windshield is shown as of the divided type, having two sections 20 which converge from the front side walls toward the center line of the body.

The rear side walls 22 are preferably substantially parallel and are placed between and within the inner line of the rear fenders 12. These rear side walls terminate at the rear of the front seat substantially inwardly of the front side walls and of the ends of the front seat. A wall portion including a window 24, is provided preferably at each end of the front seat between the front side wall and the rear side wall which affords a clear rear vision over the rear fender along the outside of the rear side wall.

The vertical support struts 26 and 27 forming the skeleton structure of the rear side walls extend the entire height of said rear wall body portion and when the body is mounted upon the ordinary chassis frame 25, the body struts 26 and 27 are supported directly upon the horizontal chassis frame and a more rigid and substantial frame structure is provided. The usual wheel housing is eliminated on the five passenger body and in its place is a simpler construction.

The front and rear side walls are provided with the usual doors on opposite sides. The front seat is capable of easily accommodating three persons which is a decided advantage if only three people are travelling at one time. The driver is insured a clear vision toward the rear over the rear fender and outside of the rear side wall. The shape of the body is such that it is more accurately streamlined than is true of the conventional type now in use and the transference of weight to the front seat promotes riding comfort of the body. The rear walls of the body being placed entirely within the fender line they are protected thereby.

This particular type of body reduces the retarding air vacuum on the rear of the car considerably over that of the conventional body design and, furthermore, due to the parallel arrangement of the rear sides of the body between the rear fenders the rear windows are adapted to be completely lowered.

Figure 2:
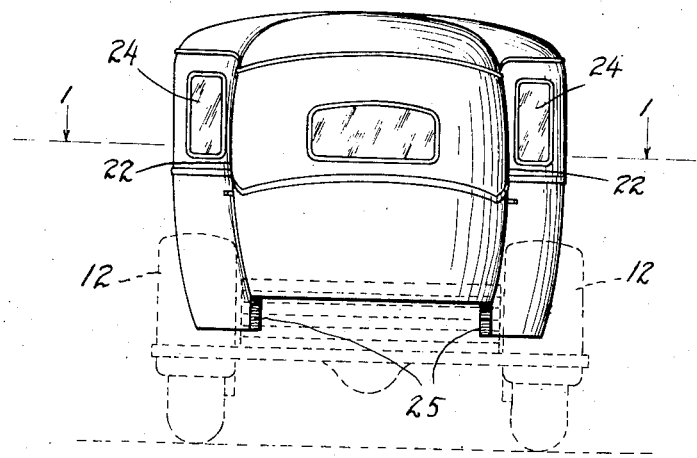
Fig. 2 is a rear elevation of my improved type of automobile body.
Figure 3:
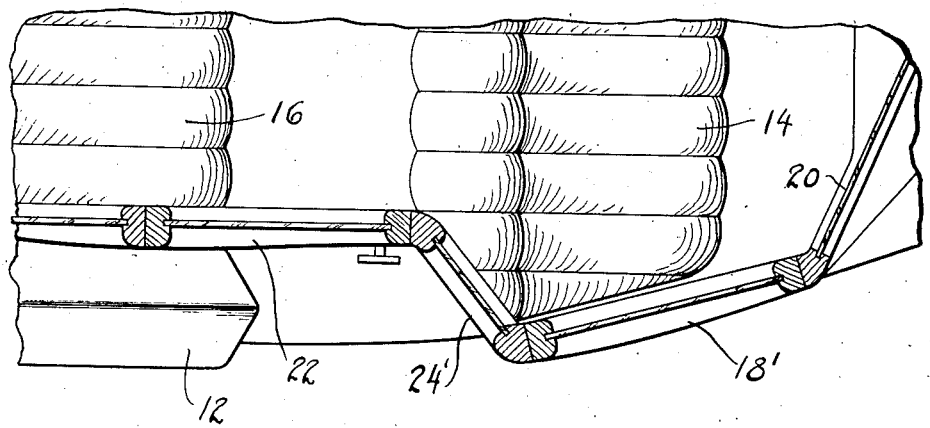
Fig. 3 is a plan view of a slight modification of my improved body type.
Figure 4:
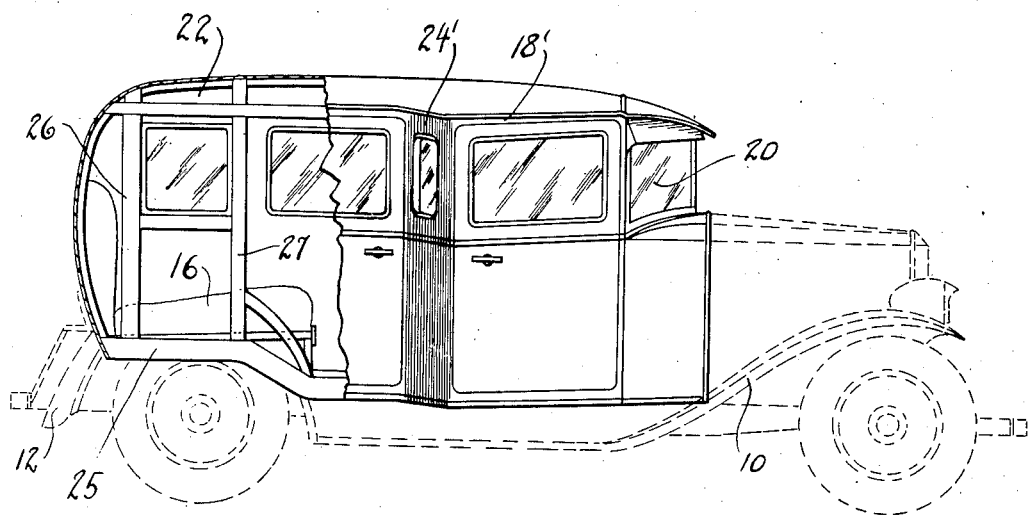
Fig. 4 is a side elevation of said modification with parts partially broken away for the sake of clearness.

Figs. 3 and 4 show a slightly modified construction. The rear side walls are identical with those disclosed in Figs. 1 and 2 but the front side walls 18' are cut short somewhat, terminating forward of the back of the front seat, approximately opposite the forward extremity of the front seat back member.

The central side walls, 24', in this construction are somewhat wider than walls 24 and extend diagonally inward to meet the front ends of the rear side walls which terminate, as in Figs. 1 and 2, at the rear of the front seat member. This arrangement not only carries out in a more finished manner the streamline motif of the body design, but permits the central side walls to carry larger windows and thereby enables those in the front seat to have a wider range of rear vision on each side of the car and also provides a roomier entrance to the tonneau.

It will be noted that the seating arrangement of the present invention is reversed as compared with the ordinary sedan type of passenger car; that is, the widest seat is in front, and the rear seat and tonneau are substantially narrower. Ordinarily the car is narrow at the front and gradually widens toward the rear, and is widest at the rear to obtain a greater seating capacity. The present invention provides a car body which is widest at a point intermediate of the front and rear seats, and provides at this intermediate point for the seating of at least three passengers, with ample elbow room for the driver laterally and outwardly from the steering wheel. This is evident by an inspection of Figure 1 which shows the side of the car and door 18 rearwardly divergent. The provision of elbow room is an important feature. The present invention provides a design which is of the stream-line type.

Another great advantage is the provision of the small window 24 directly to the rear of the driver and in the elbow room region so that he has a clear view of traffic along a line that lies within the wheel base, in this instance on a line which passes over the whole width of the fender. There is no intention, however, to be limited to the exact construction shown in the drawings, as long as clear vision panel and elbow room thereadjacent is provided, and as long as the substantial stream-line effect is obtained by having that portion of the body in which the front seat is arranged, considerably wider than the rear tonneau.

It will be noted by inspection of the drawings that the sides of the rear tonneau are parallel with the long axis of the body and lie at the inside of the fenders and between them, and that they extend downwardly below the peaks of the fenders. This allows the windows to be completely opened inasmuch as, in this instance, the framing is extended downwardly to or adjacent the level of the running boards. Inasmuch as the panels of the rear tonneau lie between the fenders, a deep stamping operation is eliminated. It must again be noted that the sills of the side windows on the rear tonneau extend to the base of the body, which construction lends itself to the production of a cheaper and neater design, easier to manufacture and stronger. Considerable joining and special forming of framing elements is eliminated.

The provision of what may be termed a driver's niche is an important feature, along with the clear vision feature, that is the arrangement whereby the line of vision lies substantially parallel with the side wall of the rear tonneau, (which side wall is substantially parallel with the long axis of the chassis) over an area including the innermost portion of the rear fender.

There is no intention to be limited to the exact construction, but only to the broad idea of providing any kind of construction whereby the width of the rear tonneau is substantially reduced over that of the front, and whereby the side walls of front and rear tonneaus are connected in such manner as to permit the placing of a rear vision window so that the driver can have an unobstructed view at a point inwardly with respect to the front tonneau and rearwardly on a line substantially parallel with the axis of the chassis and over the innermost margin of the rear fender.

The jogs or recesses formed as the result of the relation of the front and rear side body portion tend to relieve or reduce air resistance. Apparently this reduction of resistance and the provision of the window 24 also results in a change of draft conditions in the rear passenger space of the car so that the draft upon the occupants (when windows 18 and 24 are open) is substantially reduced.

What I claim is:

1. An automobile body having a front seat, a rear seat, front side walls at opposite ends of the front seat converging from rear to front, rear side walls at opposite ends of the rear seat terminating at the rear of the front seat substantially inwardly of the ends thereof and of the adjacent front side walls and windows at the rear of the front seat at each end between the front side walls and the rear side walls.

2. An automobile body having front side walls diverging outwardly and rearwardly from each side of the windshield, substantially parallel rear side walls terminating at the rear of the front seat and spaced inwardly from the ends thereof, and oppositely disposed transparency carrying central side walls extending between the rear and front ends of said first mentioned side walls.

3. An automobile, including front and rear seats, and side walls, the side walls at the rear seat being spaced apart a distance substantially less than the corresponding walls at the front seat, and lateral wall portions connecting the side walls of the front and rear body portions, at least one of the connecting portions having a window therein arranged so that the driver, when in driving position, can obtain an unobstructed view rearwardly.

4. An automobile, including a body having front and rear seats, the sides of the body being rearwardly divergent from the steering wheel to the front seat, to provide arm room in the region of the seat, laterally and outwardly from the steering wheel, the transverse width of the body at the rear seat being substantially less than at the front seat to provide a jog, and a window arranged in the jog.

5. A closed automobile body having front and rear passenger compartments bound within a single enclosure, the front compartment diverging from front to rear and having a greater width than the rear compartment, side walls conforming with the front compartment diverging from front to rear, side walls conforming to the rear compartment and extending substantially parallel, intermediate side walls connecting the side walls of the front compartment with the side walls of the rear compartment, and windows in said intermediate side walls.

6. In an automobile having front and rear wheels, a frame, a closed body carried by the frame and having body supporting members extending substantially vertically upwardly from the frame between the rear wheels, said body having front and rear passenger compartments, said front passenger compartment having a width greater than the inside dimension between the rear wheels, said rear passenger compartment having a width less than said inside dimension, and windows in the side walls of the rear passenger compartment adapted to be lowered completely between the supporting members of the rear passenger compartment and within the inside dimension of the rear wheels and to be raised to their closed position.

EARL P. HARTRY.